Aug. 5, 1941.　　　G. GOEBEL ET AL　　　2,251,517
APPARATUS FOR SOLDERING CONTAINERS
Filed June 22, 1937　　　8 Sheets-Sheet 1

Patented Aug. 5, 1941

2,251,517

UNITED STATES PATENT OFFICE 2,251,517

APPARATUS FOR SOLDERING CONTAINERS

George Goebel and Harry A. Rau, Baltimore, Md., assignors to Crown Cork & Seal Company, Inc., Baltimore, Md., a corporation of New York Application June 22, 1937, Serial No. 149,764

1 Claim. (Cl. 113—72)

The present invention relates to an improved apparatus for soldering, and while particularly directed to the soldering of the ends of tin cans to the bodies of the cans, is useful generally for securing and sealing joints as well as for conveying articles upon which one or more operations are to be performed.

An object of the invention is to provide an apparatus wherein the containers travel through a preliminary fluxing apparatus and then along a predetermined path in the soldering machine. During the travel of the cans in the soldering machine, they are subjected to a solder application, wiping and cooling. The operations are consecutively performed and the cans travel at a speed which enables large scale production of finished articles.

Another object of the invention is to provide an apparatus which is suitable for the soldering of pre-lacquered or pre-finished cans. That is to say, the invention will achieve the soldering of cans to which has been previously applied a finish or coating, and their passage through the soldering machine will not result in any marring of the finish.

Another object of the invention is to eliminate the difficulty frequently experienced where the fluxing apparatus is associated with the soldering machine, namely the piling up or collecting of cans in the fluxing apparatus, due to a slowing up in the movement of the infeed mechanism for the soldering machine. For example, where the fluxing and soldering apparatus are arranged in communicating relation, they have heretofore been driven independently and due to over-heating or other causes the motor for the soldering machine, after continuous use, develops a lag in R. P. M. such that the infeed mechanism does not accept the cans at the rate they are delivered from the fluxing machine. Consequently, the cans jam up in the fluxing apparatus and excess coats or spots of flux are formed which are highly objectionable. We eliminate this difficulty by providing for synchronous operation of the fluxing apparatus and infeed mechanism so that the rate of movement of the cans through the fluxing apparatus is timed precisely with the ability of the infeed mechanism of the soldering machine to receive and feed the fluxed cans.

By eliminating the possibility of formation of such gummy spots of excess flux and of the solder which tends to collect thereon in the soldering operation, we produce cans in which not only are the ends efficiently soldered, but whether pre-lacquered or not, the cans are free of any objectionable appearance.

A further object of the invention is to convey the cans through the soldering apparatus upon independent and positively rotated means for each can. That is to say, each can is carried upon a can carrier chuck and these chucks are positively rotated while moving through a predetermined path to undergo the consecutive operations incident to the soldering. The cans are independently carried by a conveyor and are not dependent for their movement and rotation upon a continuous belt such as heretofore utilized and which moreover in the case of pre-lacquered cans may mar the finish due to the continuous contact of the belt with the cans.

An additional feature of the present invention consists in pre-heating the cans so that, at the time of the solder application, the joint surfaces have a temperature which will enable efficient flow and adherence of the solder.

Another feature of the invention resides in applying the solder to a joint by means of a roll rotating in a direction toward the opening in the joint and whereby the liquid solder builds up in the space between the applying roll and the body of the can adjacent the joint opening creating a pressure flow or head of solder into the joint opening. Since the can is rotating, a film of solder will be applied throughout the periphery of the joint opening and by reason of the temperature of the joint and the capillarity, supplemented by the building up of a pressure head of liquid solder, as just explained, at the joint opening, the solder flows very efficiently between and adheres to the surfaces of the joint so that a very effective soldered joint is formed.

Another important feature of the present invention resides in the employment of a wiping step by which (1) solder is wiped toward and into the joint opening, and (2) the adjacent surfaces of the joint are simultaneously wiped and brushed clean. In carrying out this step, the wiping means includes a wiping roll and a brushing roll, each wiping toward the joint in opposite directions, one of the rolls acting to both wipe the solder toward the joint opening and clean the adjacent surface of the joint and the other roll acting as a cleaning roll. This step enables pre-lacquered cans to be soldered and eliminates any necessity for subsequent cleaning operations, assuring that the finished article will have a nice appearance.

In the operation of the invention, it is preferred to first pre-heat, solder and wipe one end of the can and then to cool the soldered joint whereupon the cans continue upon the conveyor and the opposite end is subjected continuously to a similar sequence of operations. Both the infeed mechanism and the outfeed mechanism for the soldering machine are located at the same end of the soldering machine, and they are both automatic, and the cans traverse a predetermined path from the infeed mechanism to the outfeed mechanism during which they are automatically subjected to the several operations described.

It is preferred to have the cans travel in a horizontal plane during their passage through the soldering machine, but the cans are independently mounted for tilting or inclination with respect to the horizontal plane for the purpose of clearing the infeed mechanism after being applied to the can carrier chuck and at the time of removal of the cans from the chuck at the outfeed device. In some cases also, the cans are given tilting movement after each soldering step so that the joint opening to which solder has been applied opens upwardly to cause the solder to flow therein, but this is not preferred and in most cases is unnecessary.

The apparatus is subject to considerable modification and change and we have shown and will describe a preferred construction and certain modifications, but it is to be understood that these are for purposes of illustration and the invention is not limited to the precise method or construction herein set forth.

Referring to the drawings.

Figure 1:
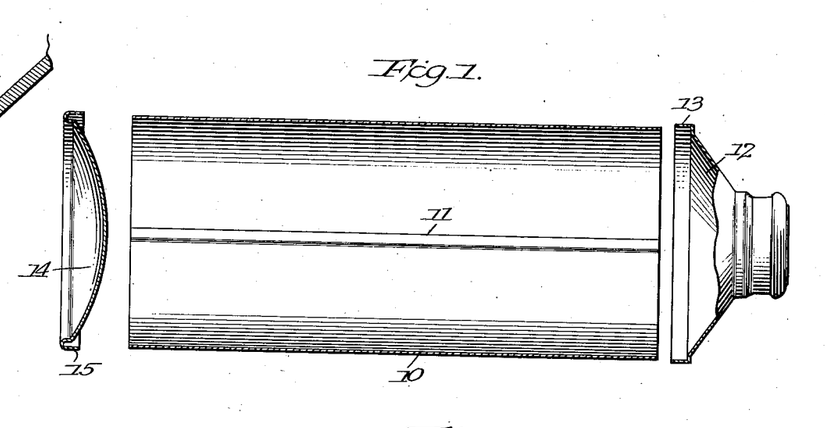
Figure 1 is a sectional view of the can in disassembled relation.
Figure 2:
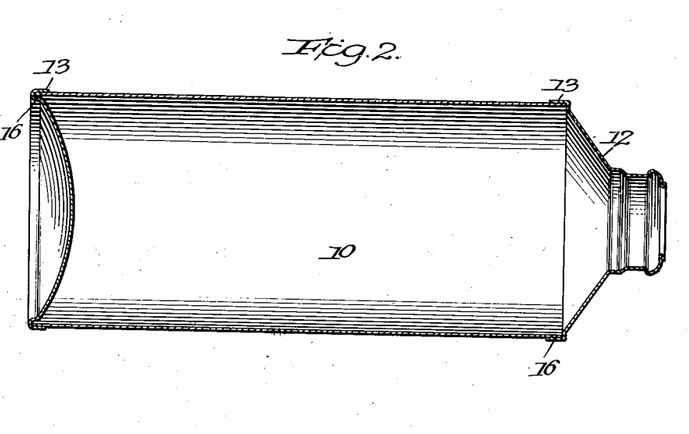
Figure 2 is a sectional view of the can assembled.

In the drawings, we have illustrated at 10 in Figure 1 a cylindrical metal can body having the usual side seam 11. Associated with the body is a top having a conical portion 12 and a vertical flange 13 adapted to overlap the upper end portion of the body 10 as shown in Figure 2. Also, associated with the body 10 is a bottom having an indented portion 14 and a vertically extending flange 15 which is likewise adapted to overlap the bottom end portion of the body 10 as shown in Figure 2. The several parts of the can are illustrated in assembled relation in Figure 2 and the ends are soldered to the body at the overlap joints 16. It will be understood that in the original assembly of the top, bottom and body, that the parts are so closely fitted that a rigid structure is maintained until the parts are permanently united.

Figure 5:
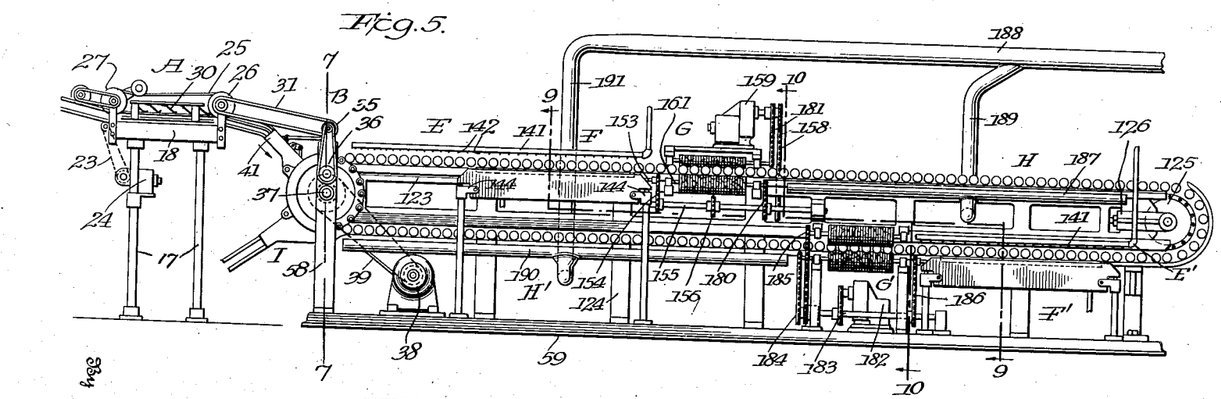
Figure 5 is a side elevation of the assembled solder machine and fluxing machine.
Figure 7:
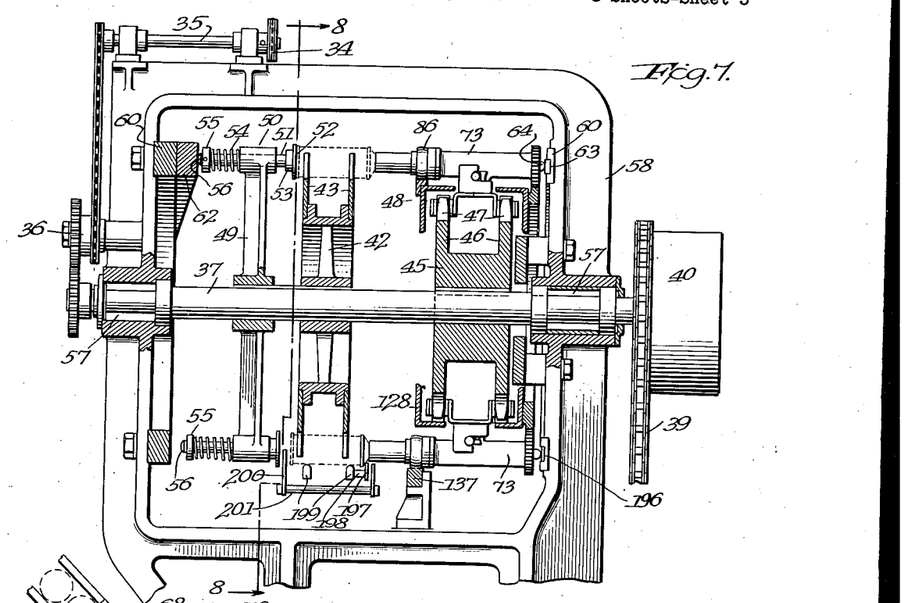
Figure 7 is a vertical transverse section on the line 7—7 of Figure 5.
Figure 8:
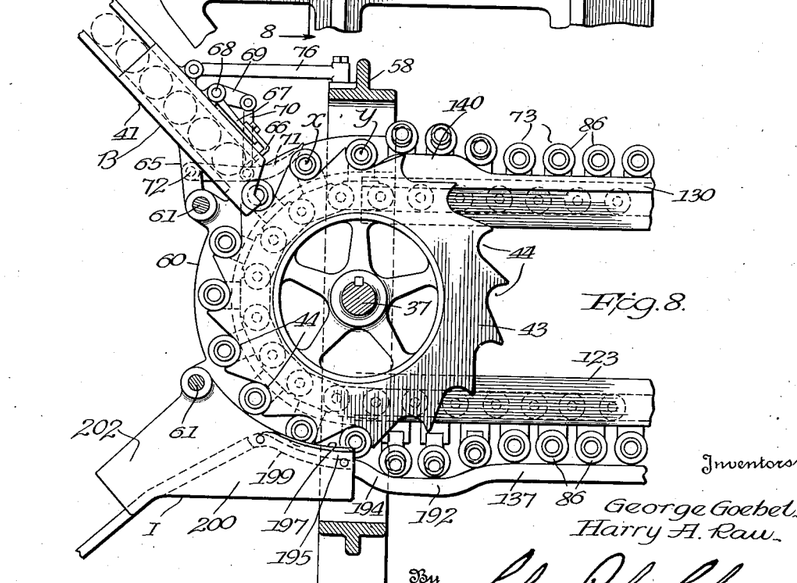
Figure 8 is a vertical longitudinal cross-section on the line 8—8 of Figure 7.
Figure 9:
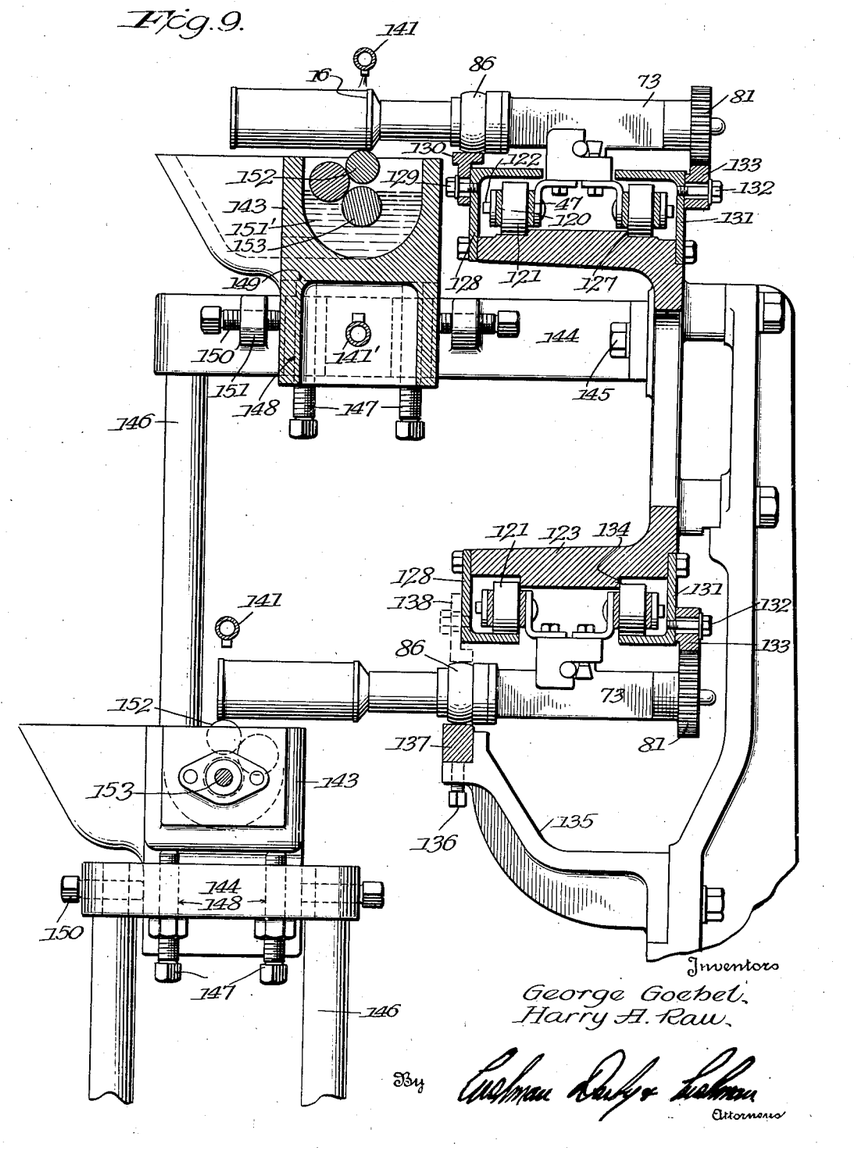
Figure 9 is a vertical transverse cross-section on the line 9—9 of Figure 5.

The can assembled as shown in Figure 2 is first treated in a fluxing apparatus indicated as a whole at A in Figure 5 where a film of flux is applied about the periphery of each of the joints 16. Thereafter, the can is fed to the infeed mechanism B of the soldering apparatus, as shown in Figures 5, 7 and 8. At the infeeding means, each can is positioned upon a separate can carrier or chuck C as shown in Figure 11 and carried by a conveyor D shown in Figure 15 first through a pre-heating zone E as shown in Figure 5, then past a soldering instrumentality F as shown in Figures 5 and 9, then past a wiping instrumentality G shown in Figures 5 and 10, and finally through a cooling zone H as shown in Figure 5. These treatments take place on the upper run of the conveyor away from the infeed mechanism and upon one end joint 16 of each can e. g. the top joint, and similar consecutive operations of preheating, soldering, wiping and cooling as indicated at E', F', G' and H' are performed on the lower return run of the conveyor, to solder the bottom joint 16.

The finished soldered containers are automatically discharged through the outfeed mechanism which is indicated as a whole at I as shown in Figures 5 and 8 and located at the same end of the soldering machine as the infeeding means B. It will be observed that all of the operations are automatic and continuous.

*The fluxing apparatus*

Figure 6:
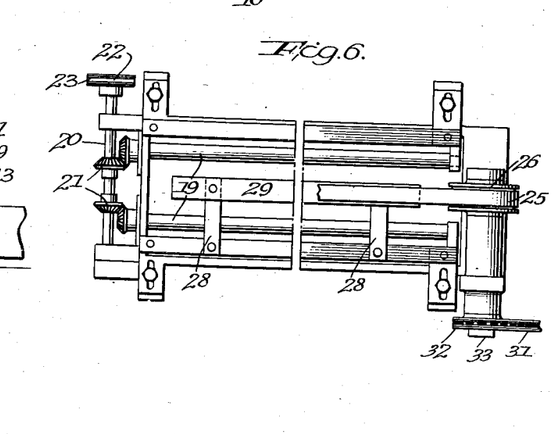
Figure 6 is a top plan view of the fluxing mechanism.

The flux applying apparatus A is indicated in Figure 5 and shown more in detail in Figure 6. It is of conventional type and includes supporting legs 17 upon which are carried a receptacle 18 for holding the fluxing solution. Working in the fluxing solution are a pair of flux applying rollers 19 which extend longitudinally of the receptacle 18 and are rotated in opposite directions toward the openings in the joints 16 and on axes parallel to the path of travel of the cans thereover, by means of a shaft 20 and suitable gearing 21. The shaft 20 is operated from a sprocket 22 over which runs a chain 23 as shown in Figure 5 to a suitable motor 24. By having the rollers rotate in opposite directions, the flux is simultaneously applied as a film toward the opening defining the joint 16 at each end of the can. The containers shown in Figure 2 are moved longitudinally over the rotating flux applying rollers 19 by means of a belt 25, moving over pulleys 26 and 27. The lower run of this belt engages the cans and they are held between the same and the rollers 19 and are propelled and rotated across the rolls by means of the moving belt so that flux is applied throughout the periphery of each joint 16. In order to maintain a firm contact and assure that the cans will be positively rotated and propelled longitudinally across the rolls, suitable brackets 28 are fixed to the receptacle 18 and carry a bar 29 which is centrally disposed between the rolls 19 and between the runs of the belt 25. This bar 29 has downwardly extending resilient fingers 30 which bear upon the upper side of the lower run of the belt and resiliently maintain it in contact with the cans at all times.

The pulley 26 is positively driven from the solder machine through a chain 31, operating over a sprocket 32 on the pulley shaft 33 and a sprocket 34 mounted on a shaft 35 which is driven through a gear and chain mechanism indicated as a whole at 36 from a shaft 37 for moving the infeed and conveyor mechanism of the solder machine. The shaft 37 is rotated by means of a motor 38 through the chain 39 which drives through an automatic clutch mechanism 40. Since the can infeed and conveyor means for the solder machine and the belt 25 of the fluxing apparatus are operated by this shaft 37 from a single prime mover 38, all of the parts are synchronously operated, and the timing is such that the cans feed evenly and continuously to the infeed mechanism and there is no possibility of cans collecting in the fluxing apparatus due to a lag in the movement of the infeed and conveyor means or of overfeeding by the fluxing apparatus.

*Can feeding apparatus*

The cans from the fluxing apparatus are delivered continuously by gravity through an inclined chute 41 to the infeed mechanism of the soldering machine.

Referring to Figure 7, there is keyed to the shaft 37 a spider 42 upon the periphery of which is secured a pair of circular spaced plates 43 provided with a plurality of aligned can receiving pockets or recesses 44. These plates 43 constitute the feeding device to which cans are delivered from the chute 41 and the cans are continuously positioned upon the can carriers C and removed from the pockets.

Also keyed to the shaft 37 is a hub 45 carrying a pair of spaced sprocket wheels 46 integral with the hub for engaging between the rollers of and moving a pair of conveyor chains 47. Carried by the conveyor chains 47 and integral therewith are brackets 48 upon which are mounted the can carrying chucks C, these chucks being disposed in such spaced relation, and the sprocket wheels being of such diameter, that the can receiving head of one of the can carrier chucks will always be disposed in alignment with one pair of recesses 44 in the feeding plates 43 to receive a can from the respective pocket.

Also keyed to the shaft 37 on the opposite side of the spider 42 is a spider 49 having at its periphery a plurality of hollow bosses 50, which are spaced apart a distance equal to the spacing of the recesses 44 in the plates 43 and the spacing between the heads of the can carrying chucks C. Thereby, in the rotation of the spiders 42 and 49 and the hub 45 by the shaft 37, the pockets 44, bosses 50 and the can receiving heads of the chucks C are always in alignment.

Disposed in each of the bosses 50 is a stem or plunger 51 having at one end a disc 52 and a shoulder 53 of greater diameter than the opening in the boss 50. On the opposite side of the boss, the stem is surrounded by a spring 54 confined against a collar 55 and the adjacent end of the boss, and normally urging the disc 52 rearwardly toward the boss. The free end of the stem projects beyond the collar 55 to form a cam contact piece 56 as will be later described.

Referring to Figures 5, 7 and 8, it will be noted that the shaft 37 is mounted for rotation in suitable bearings 57 in a frame 58 which is mounted upon a base 59. Secured as by bolts to each side of the frame 58 are segments 60 which are connected together by tie rods 61. Fixed to one of the segments 60 is a cam 62 adapted to be engaged by contact piece 56 and likewise fixed to the opposite segment 60 in aligned relation to cam 62 is a cam 63 adapted to be engaged by a cam contact piece 64 on the can carrier C.

Referring to Figures 7 and 8, as the cans which may be pre-lacquered or carry a surface finish, move down the chute 41 from the fluxing apparatus and the can feeding device 43 and the conveyor carrying the can carriers C is revolving about the shaft 37, cans are successfully fed in timed relation to the recesses 44 in the plates of the feeding device, by an infeed gate mechanism indicated as a whole at 65. This mechanism includes a gate 66 extending into the path of cans in the chute 41, which gate is connected to a lever 67 carried on a short shaft 68 pivotally mounted on the chute, to which shaft is connected a lever 69 having pivoted thereto a link 70 connected to a trip lever 71 pivoted at 72 on the chute 41. As the can carriers C travel about the shaft 37, the bodies 73 thereof successively engage the finger 71 to raise the gate 66 and allow cans to drop by gravity into the recesses 44 of the plates 43. As the feed plates or feeding device carrying the cans move up from the mouth of the chute, for example, reach the point X, the cam contact piece 56 of the plunger 51 engages the cam 62 to move the disc 52 to the right as shown in Figure 7 into contact with the bottom of a can and push the neck of the can on to the can receiving head 74 of the aligned can carrier as shown in Figure 11. At this point, the cam 63 is in engagement with the cam contact piece 64 on the carrier to move the head 74 of the can carrier toward the can in alignment with the opening therein and causes the fingers 75 of the can carrying head 74 to lie in collapsed position as shown in Figure 11. This allows the neck of the can which is being moved at the same time toward the head by the disc 52 engaging the bottom of the can to be positioned on the can receiving head for gripping by the fingers as shown in Figure 12, and the neck of the can to be positioned within the neck receiving throat, as will be later described. In this manner, namely, by the simultaneous movement of the can toward the chuck C and the movement of the head 74 toward the mouth of the can, the can is disposed in gripping relation on the can carrier C and as the feeding device 43 and the cam carrier revolve, the can carrier contact piece 64 moves off of the cam 63 causing the head 74 to retract and return to its normal position with the fingers 75 expanded to grip the can as shown in Figure 12. Likewise, the cam contact piece 56 is disengaged from the cam 62 and the plunger resumes its normal position with the disc 52 retracted. The cans in such gripped relation are now carried by the conveyor and subjected to the several steps incident to carrying out the soldering operations of this invention.

It will be observed that the feeding operation is entirely automatic and that it is timed with the feeding of cans through the fluxing apparatus. Hence, there is no possibility of overfeeding in the fluxing apparatus and objectionable jamming of cans due to any lag in the rate of movement of the can infeeding means and conveyor of the soldering machine or lag in the rate of feed of cans through the fluxing machine.

It is to be noted that the can receiving head 74 of the can carrier C is aligned with the opening in the neck or top of the container and that the disc 52 of the plunger 51 is likewise aligned with the container at the point X. The gripping of the can by the head 74 is rapid, and the can is in gripping relation as shown in Figure 12 by the time it has reached the point Y as shown in Figure 8. Hence, a very rapid can feeding device is provided enabling the machine to develop a high speed of operation.

The bar 76 as shown in Figure 8 is a bracing bar for the chute 41 and is connected thereto and to the frame 58 as shown. This bar may permit a certain amount of free play in the chute to take care of vibration if necessary by pivoting the bar 76 at either end.

Can Carrier or Chuck

Referring to Figure 11, the can carrier includes the fixed body 73 within which is rotatably disposed the shaft 77 suitably mounted upon roller bearings 78. At one end, there is fixed to the shaft by the screw 79 and pin 80 a gear 81 by which the shaft is rotated.

At the opposite end of the shaft, a can engaging throat 82 is adjustably threaded upon the shaft 77 and engages a shoulder 84. Between the end of the body, and a shoulder 85 on the shaft there is disposed a roller 86 which is freely mounted for rotation upon the shaft on suitable roller bearings 87. Any convenient packing 88 is disposed in the recesses between the shoulder 89 of the body and the shoulder 90 of the roller, and the side 91 of the roller and the end 92 of the throat. This prevents foreign matter from entering the bearings and retarding the free rotation of the several parts.

Extending through an opening 93 in the shaft 77 and reciprocatingly slidable therein is a plunger rod 94. At one end of said rod, there is adjustably threaded the cam contact piece 64 which it will be noted extends partially into a recess 95 formed in the shaft 77 and is slidable therein. Within this recess, and confined by the wall of the recess at one end and the adjacent edge of the contact piece 64 at the other end is a spring 96 which normally acts on the contact piece to urge the plunger 94 and contact piece 64 outwardly from the gear 81.

The throat 82 has an internal annular shoulder 97 defining with the end of the shaft 77 a recess 98. The plunger 94 has connected to its end within said recess the can carrying or gripping head 74 as by a pin 99. This head 74 has an annular rib 100 and an inwardly inclined came surface 101. The rib 100 is provided with slots 102 for receiving the can gripping fingers 75. These fingers each have an inclined surface 104 at the end adjacent the cam surface 101 and at their opposite ends are provided with feet 105 extending at right angles to the body portions of the fingers and disposed in rear of the shoulder 97. Engaging the feet 105 of the fingers is a washer 106 against which bears a spring 107 confined by the washer and the adjacent wall of the shaft 77 and pressing the feet 105 of the fingers against the shoulder 97.

When the contact piece 64 is engaged with the cam 63 as shown in Figure 11, the latter moves the rod 94 and the head 74 inwardly toward and in alignment with the opening or neck of a can, and the fingers fall into parallel alignment with their inclined surfaces 104 resting against the inclined cam surface 101 of the head. When the contact piece moves off of the cam 63, the plunger is retracted under the force of the spring 96 and with it the head 74. The cam surface 101 of the head 74 thus bears against the inclined surfaces 104 of the fingers, causing them to expand radially as shown in Figure 12 into gripping relation with the interior portion of the neck, forming a triangular pyramid, the base or portion within the can being of greater size than the opening of the can.

The throat 82 has an inclined can engaging portion 108 for engaging the inclined top of the can and the throat is of a diameter to receive the neck of the can. This construction in cooperation with the fingers 75 as shown in Figure 12 assures that the can will be rigidly supported in a horizontal plane during rotation of the shaft 77 and the can, and in a manner to avoid any marring of the finish while the can is traveling through the soldering machine, i. e., the inclined surface 108 of the throat is narrow, so that the engagement of the throat and can is along a relatively small area. The throat moreover aids in aligning the neck of the can with the gripping head 74 and the can carrier.

The gripping relation between the fingers 75 and the neck of the can as shown in Figure 12 assures that the can cannot be pulled off of the fingers which in their expanded relation comprehend a diameter greater than the diameter of the opening in the can, and this gripping relation can only be discontinued by causing the rod 94 to move inwardly to the position shown in Figure 12. It is to be noted that the only possible way for this to occur is by pressure upon the cam contact piece 64, and the infeed mechanism is so constructed, that after the cam contact piece 64 moves away from the cam 63, the contact piece is not again engaged or pressed until the soldering operation is completed and the can is ready for removal from the machine. In this connection, the throat 82 encloses the head 74 and fingers 75 and its engagement with the inclined top of the can is such as to prevent dust or other undesired substances from entering the throat to possibly disrupt the operation of the can engaging head. Moreover, the throat is easily removable so that access may be had to all of the parts of the can receiving head.

The can when gripped by the chuck as shown in Figure 12 will be rotated by reason of the rotation of the shaft which rotates the rod 94 carrying the fingers 75 and the throat 82, the inclined inner surface of which is in engagement with the inclined top of the can, the can being drawn against the throat by the action of the expanded fingers 75.

Figure 15:
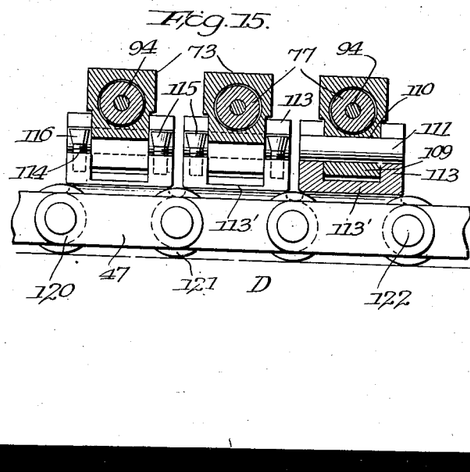
Figure 15 is a cross-section on the line 15—15 of Figure 11.

The body 73 substantially intermediate its ends is formed with a downwardly extending integral projection or block 109, which is provided with an opening 110 to receive a shaft 111 the ends of which project from the opening on opposite sides as shown in Figure 15 and are received in opposed recesses 112 formed in the sides 113 of a substantially U-shaped supporting member 113'. It is to be noted that the sides 113 are cut-away toward one end so that the ends of the shaft 111 may be positioned in the recesses 112. Fitted in the top edges 114 of the reduced portions of the walls 113 are screws 115 having beveled heads 116. The screws 115 are threaded into the top edge portions of the walls 113 and their bevelled head surfaces engage the periphery of the shaft in a manner to permit the body 73 to rock upon the shaft for a purpose which will presently be described. The screws 115 not only secure the body 73 to the supporting member 113' and afford a tilting movement for the body and the can supported by the can carrier during certain movements of the conveyor, but likewise permit the can carrier to be easily removed as a unit from the supporting member 113'.

The bottom 117 of the supporting member is secured to the flat angular integral extensions or brackets 48 of the links 47 of the conveyor chains as by bolts 119.

As shown in Figures 9 and 15, the links 47 of each chain overlap and are connected in overlapped relation as shown at 120 upon opposite sides of a roller 121 by means of the shafts 122 which pass through openings in the rollers and in the overlapping ends of the links.

The movement of the can gripping head 74 toward and into alignment with the neck of the can, to occupy a position for gripping a can, and the retraction of the head and expansion of the fingers to grip the can, is very quick; also the operations of gripping a can, and releasing the same after the soldering operation are simultaneous and continuous in the operation of the machine.

The can carriers or chucks afford individual means for carrying the cans through the soldering machine, and assure that they will be positively rotated, as distinguished from the usual moving contact belt which heretofore has been used for this purpose.

Various types of throats may be used as will be appreciated with different types of cans, but it is important that the throat align the can with the can carrier, have a minimum of engagement with the can top or body, and allow accessibility to the carrier.

The method of carrying the can which has been described, provides a means whereby the entire exterior of the body, top and bottom portion are free and clear of any supporting means. Being free of any obstruction, work of any nature may be performed on the entire exterior surface thereof.

After each can has been gripped by the can receiving head 74, the conveyor carries the can through the soldering apparatus which will now be described.

*The soldering machine*

Referring to Figure 5, the conveyor and the instrumentalities for accomplishing the soldering operation are mounted upon horizontal frame members 123, which in turn are supported upon vertical frame members 124, the latter being disposed upon the base 59. A sprocket 125 similar to the sprocket 45 at the infeed end is supported at the opposite end of the machine upon the frame members and is suitably adjustable by means shown at 126. The rollers 121 of the chains 47 constituting the conveyor are engaged by the sprockets and the conveyor is continuously operated from the infeed end of the machine by the sprocket 45 which is actuated from the motor 38.

Figure 10:
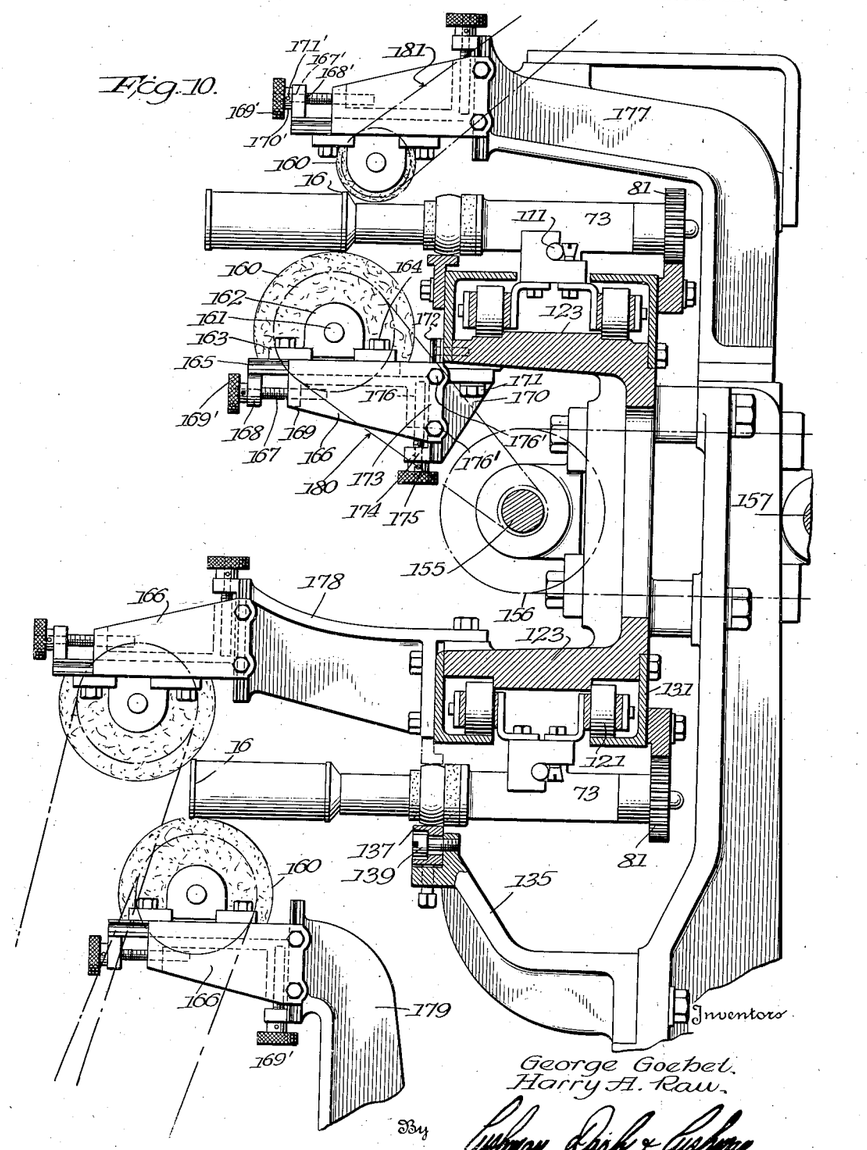
Figure 10 is a vertical transverse cross-section on the line 10—10 of Figure 5.
Figures 11, 12, 13, 14:
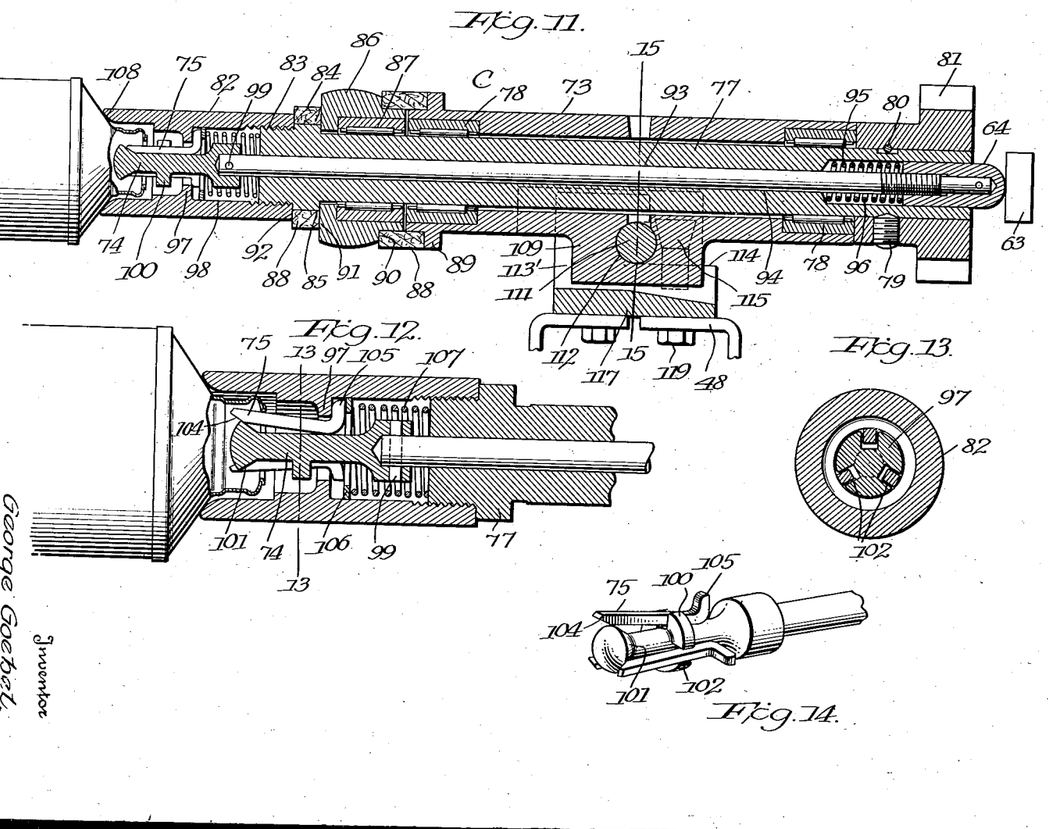
Figure 11 is a cross-section through one of the can carrying chucks.
Figure 12 is an enlarged cross-section of one of the can carrying chucks showing the can in gripped position.
Figure 13 is a cross-section on the line 13—13 of Figure 12.
Figure 14 is a perspective view of the can gripping means.

Referring to Figures 9 and 10, the horizontal frame member 123 is substantially channel shaped and the upper horizontal leg forms a track upon which the rollers 121 travel, being formed with shoulders 127 to guide the rollers, and prevent lateral movement thereof. At one edge of the upper leg of the channel member, there is secured an angle member 128, and to one side of this member there is secured for vertical adjustment by means of the threaded studs 129, a track 130 which supports the forward end of the can carrier by means of the roller 86 for movement thereover.

At the opposite edge of the upper horizontal leg of the channel member there is secured a similar angle member 131 to one side of which is secured for vertical adjustment by means of studs 132 a rack 133, the teeth of which engage the teeth of the gears 81 of the can carriers for continuously rotating the can carrier shafts 77 (and the cans) as the carriers travel through the machine on the conveyor.

It will be noted that the angle members 128 and 131 extend over the rollers 121 to confine the same during the upper run of the conveyor, while in the lower run of the conveyor as shown in Figures 9 and 10, these angle members support the rollers 121 for movement of the conveyor thereover. In this latter position of the chains and chuck carriers, the under-surface of the lower leg of the channel is provided with shoulders 134 for guiding the rollers and preventing lateral movement of the conveyor. Bolted to one of the vertical frame members 124, is an arm 135 upon which is held for vertical adjustment by means of studs 136 a track 137 for the roller 86 in the lower run of the conveyor.

The horizontal channel member 123 extends throughout the length of the machine between the sprockets 45 and 125 while the angle members 128—131, the track 130—137, and the rack 133, are continuous with the chains forming the conveyor, these parts being curved and joined at the ends of the machine to conform to the path of movement of the chains as they move over the sprockets.

In the case of the lower run of the conveyor, a vertically adjustable member 138 may in some cases be adjustably fixed to the angle member 128 to extend downwardly therefrom coextensive with the track 137 and guide the top of the roller 86 as it moves over the track 137.

Referring to Figure 10, the horizontal screw 139 indicates the manner in which the track 130—137—138 and rack 133 are fixed to the frame at spaced points, after being vertically adjusted by the studs associated with these members.

The cans after being gripped by the can carriers as shown in Figure 12, are removed clear of the feeding device 43 by providing the track 130 with a raised or cam portion 140 as shown in Figure 8 of a height and extending for a sufficient distance longitudinally to raise the cans free of the ends of the pockets 44 in the feeding device. It will be understood that the rollers 86 engage the cam portion 140 of the track 130 and thereby rock the can carrier bodies 73 about the shafts 111 so that the carrier and can are tilted upwardly out of the path of the feeding device. It is to be understood that the rack is of a contour to conform with that of the cam portion 140 of the track so that the gear 81 is constantly in mesh therewith. Thereafter, the can carrier and can assume a position in a horizontal plane as shown in Figures 5 and 8.

The heating step

The can carriers with cans gripped thereon travel through a heating zone E which consists of a pipe 141 having a multiplicity of downwardly directed burners 142 from which projects a suitable gas flame. Preferably, a can is gripped and supported at the end which is to be soldered first, and the flames are directed upon this end. In the present case, the top end is gripped in the can carrier, and the flame plays upon the joint 16 to thoroughly heat the same so that in the subsequent solder application, the solder will readily flow into the joint and adhere efficiently to both surfaces of the overlapped joint. A similar preheating zone E' is provided in the lower run of the conveyor.

Solder application

From the heating zone, the cans pass continuously to the soldering apparatus which is best shown in Figures 5 and 9.

This soldering construction includes a container 143 for the solder which is supported from brackets 144 at each end of the container. The brackets 144 are connected at one end to the supporting member 123 as by bolts 145, and at their opposite ends are supported by standards 146 from the base 59. The container 143 is vertically adjustable through the medium of threaded studs 147 extending up through threaded openings 148 in the brackets and engaging the bottom of the container as shown at 149. The container is likewise laterally adjustable by means of the studs 150 threaded in ears 151 on the brackets 144.

The burner 141 extends throughout the length of the solder bath and the container bottom is recessed to receive a similar burner 141' as shown in Figure 9, whereby the solder is maintained fluid.

Positioned within the container is the solder 151' which is applied to the joint 16 through the medium of the rolls 152, one of which contacts with the joint 16 of the rotating can as shown in Figure 9. These rolls are geared together and the lowermost roll is operated from a shaft 153 as shown in Figure 5 which is rotated by a chain and sprocket connection 154 from the shaft 155 which is operated by a chain and sprocket connection 156 from a shaft 157 as shown in Figure 10 which latter is operated by a chain and sprocket connection 158 with the motor 159 suitably supported on the fame as shown in Figure 5. The roll 52 which contacts with the rotating can at the joint 16, rotates in a direction to move the solder toward the opening in the joint, and it is to be understood, that the rollers extend longitudinally of the path of movement of the cans and rotate on axes at right angles to the axes of rotation of the cans.

Figure 3:
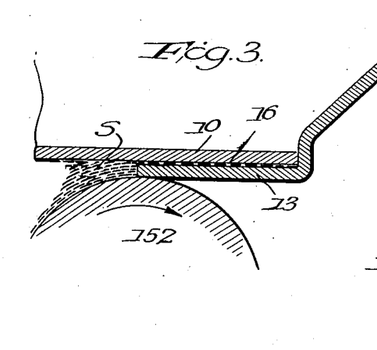
Figure 3 is an enlarged cross-sectional view of the joint at the top of the can in position on a solder applying roll.
Figure 4:
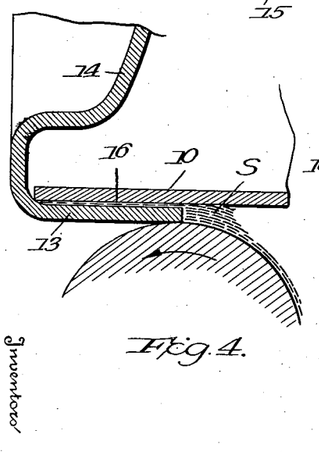
Figure 4 is an enlarged cross-section of the joint at the base of the can in position on a solder applying roll.

Since the joint is thoroughly heated in the preheating zone, and because of the capillary effect exerted by the joint, supplemented by the pressure of the liquid solder building up in the space between the can body and the roll 152, as shown at S in Figures 3 and 4, adjacent the joint, the solder flows efficiently into the joint and a thoroughly sealed and secure joint is formed.

In the lower run of the conveyor, a similar soldering apparatus F' is provided except that the container 143 is supported in brackets 144 which at both ends are mounted upon standards 146 from the base 59. In this lower run of the conveyor, the bottom joint 16 is soldered, and the roll 152 which contacts with the can operates in a direction opposite to that of the upper roll 152 of the soldering path previously described but in the same manner to move the solder toward the opening in the joint.

Since the can is rotating by reason of the engagement of the gear 81 with the rack 133, the entire periphery of the joint will be supplied with a film of solder and assure that the joint will be completely sealed and secured.

The wiping step

After the completion of the soldering step, the cans are continuously traveled through a wiping instrumentality G shown best in Figures 5 and 10. This mechanism includes a pair of rolls 160 which are simultaneously rotated in clockwise directions. The lower or wiping roll engages the periphery of the joint to wipe the solder into the opening of the joint 16 and to clean the adjacent surface of the joint. The upper or brushing roll brushes the adjacent peripheral surface of the joint to likewise clean the same. Both rolls wipe or brush in opposite directions toward the joint opening. These rolls may be in the form of rag wheels, felt rolls, or some other suitable material which will not mar the surface of the metal as the rolls perform their wiping and cleaning functions. The rolls are preferably of the same diameter and while the lower wiping and cleaning roll is shown as of greater diameter than the upper cleaning roll in the present instance, the reduced diameter of the upper brushing roll is to facilitate access to the adjacent surface of the joint of the particular can. Since the cans are rotating, this wiping mechanism acts throughout the periphery of the joint and assures that the solder will be moved toward the joint opening and that the surfaces about the joint will be clean and of nice appearance. Hence, it is possible with the present invention to pre-lacquer the cans without danger of marring the finish or final appearance of the cans.

Referring to Figure 10, the lower roll 160 is mounted on a shaft 161 carried in suitable bearings 162 having right angled bracket portions 163 which are bolted by bolts 164 to a plate 165. This plate is longitudinally slidable on a pair of bracket members 166 and is adjustable laterally through the medium of the threaded stud 167 extending loosely through an opening in the ear 168 formed on the plate 165 and engaging threadedly in an opening 169 in a web uniting the bracket members 166. The stud is provided with a reduced portion 167' forming a shoulder 168' engaging on one side of the ear 168, while the knob 169' is provided with a reduced portion 170' forming a shoulder engaging the ear on the opposite side. The knob 169' is secured to the end of the stud as by a pin 171'. In this manner, rotation of the knob 169', will serve to adjust the plate 165 laterally so as to properly position the lower or wiping roll 160.

The bracket members 166 are vertically adjustable upon a bracket 170 bolted at 171 to the underside of the adjacent leg of the channel member 123 and this bracket 170 has a pair of spaced V-shaped vertical grooves 172 receiving V-shaped projections formed at 173 on the inner walls of the bracket members 166. The bracket 170 has an ear 174 in which is loosely mounted a threaded stud 175 similar to the stud 167 and engaging in a threaded opening 176 in another web connecting the bracket members 166 whereby the bracket members 166 carrying the plate 165 and wheel 160 are raised or lowered. The mounting of the stud 175 in the opening in the ear 168 is similar to the mounting of the stud 167. The bracket members are held in adjusted position with the V-shaped grooves 172 engaging in the V-shaped projections 173 by means of horizontally extending threaded locking studs 176'. The upper roll 160 is adjustably supported in a similar manner from the frame 177. The purpose of this adjustment is to insure that the rolls will always line up with the joint to which the solder has been applied and to take care of wear.

The upper pair of rotating rolls 160 wipe and brush the top joint 16 of the can during the upper run of the conveyor while a similar lower pair of rotating wiping and brushing rolls 160 rotating in a counter-clockwise direction wipe and brush the bottom joint 16 of the can during the lower run of the conveyor. The upper or brushing roll of the lower pair is adjustably mounted in the same manner as just described upon an arm 178, and the lower or wiping roll is similarly adjustable upon a supporting frame 179. In this manner not only are the top and bottom joint surfaces wiped clean, but the solder is directed into the joint openings. Thus, a can so treated has a nice appearance.

The shaft 161 for the lower of the upper pair of rolls 160 is rotated by a chain and sprocket connection 180 to the shaft 155 while the upper roll is rotated by a chain and sprocket connection 181 with the motor 159.

In the case of the lower pair of rolls, a motor 182 has a sprocket and chain connection with a shaft 183, which shaft has independent sprocket and chain connections 184 and 185 with the shafts of the lower wiping roll and the upper brushing roll respectively, as shown in Figure 5.

The rag wheels which form buffing rolls may be so arranged on their shafts as to bring to the surface of the can either a soft or hard buffing face or both. Thus, a buffing wheel may present during initial engagement with the joint a hard surface capable of moving solder into the joint and which hard surface will be produced by grouping a series of rag wheels and drawing them together on the shaft by means of washers and nuts until they form a compressed, relatively hard buffing surface. Thereafter, the number of wheels in the grouping so formed may be progressively reduced, and the groups segregated by means of spacers until finally single wheels are spaced apart producing a relatively soft buffing surface. In this manner the can is initially subjected to the hard buffing surface, which, as stated, will act to force the solder into the opening and, thereafter, to progressively and relatively softer wiping surfaces which act to clean and polish the adjacent surfaces of the joint. It is to be understood, that during this operation the temperature of the can, is sufficiently high to maintain the solder in a molten state.

In this connection, the lowermost solder roll 152 of the lower solder bath to which the other rolls are geared is operated by a chain and sprocket connection 186 from the shaft 183.

The cooling step

From the wiping instrumentality, the cans travel continuously through a cooling zone where the top joint 16 is subjected to streams of cool air discharged from the pipe 187. This pipe 187 communicates with a conduit 188 by a branch 189 and the pipe 190 for the lower run of the conveyor communicates with the conduit 188 through the branch 191. In this cooling zone, the joint is suitably cooled, and the solder hardened.

It will be observed that all of the operations are continuous and automatic and that the cans travel first along the upper run of the conveyor where one of the joints is preheated, soldered, wiped and cooled, in the present case the top joint 16, whereupon the cans travel through the lower run of the conveyor and the opposite or bottom joint 16 is similarly preheated, soldered, wiped and cooled. For preheating the joint prior to soldering in the lower run of the conveyor, the burner pipe 141 extends in advance of the solder contact roll 152 for at least a sufficient distance to heat the can bottom joint to a point as will promote ready flow and adherence of the solder.

The outfeed mechanism

As the cans leave the lower cooling zone H', the track 137 is depressed as shown at 192 so that the carrier C tilts downwardly on the shaft 111 a sufficient distance for the can to clear the ends of the pockets in the feeding device 43. It is to be understood that the rack 133 is of a contour to conform with that of the depressed portion 192 of the track so that the gear 81 is constantly in mesh therewith. The track is then elevated as shown at 194 and at the point 195 the cans are registered in the pockets 44. At this point, the contact piece 64 engages a cam 196 on the segment 60 and the plunger 94 is depressed, throwing the fingers 75 to the position shown in Figure 11, and so that the can may be removed for the can-receiving head 74. At the same time, there is interposed in the path of the conical end of the can a fixed outfeed cam 197 as shown in Figure 7 which extends in a horizontal plane at an angle to the longitudinal axis of the can, and since the can is in releasable position on the can-receiving head, it pushes the can off of the head. The outfeed cam 197 is connected by a bracket 198 to one of the rails 199, forming the bottom of an outfeed chute defined by the side walls 200 and connected together by cross rods 201. In this manner, the cans are automatically removed from the can carriers and drop onto the rails 199 whereby they are delivered to the chute 202 in which they are ejected by gravity from the machine. The rails 199 are connected to the walls 200 of the chute in any suitable manner. As the cans move away from the point 195, and the cam piece 64 moves off of the cam 196, the can-receiving head resumes the position shown in Figure 12 with the fingers 75 expanded, but again assumes a position to receive a can as shown in Figure 11 when in the revolution of the shaft 37, the contact piece 64 engages the cam 63.

Figure 16:
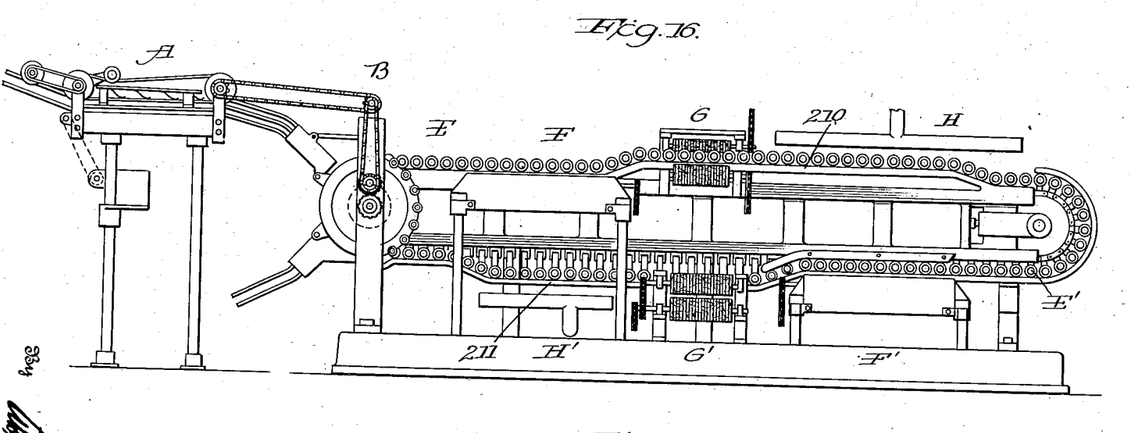
Figure 16 is a side elevation of a modified form of soldering mechanism.
Figure 17:
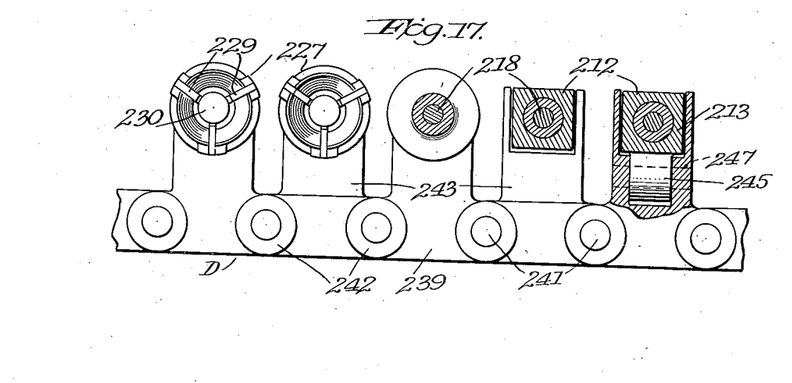
Figure 17 is an enlarged side elevation of a modified form of can carrying means particularly for use in the modified form of soldering mechanism.

Referring to Figure 16, we have shown a modified type of soldering machine which differs from the machine shown in Figure 5 in that after the soldering operation, the track 130 is raised as shown at 210 in a manner to cause the can carrier to tilt upwardly and with it the can whereby during the wiping and cooling steps, the opening in the top joint is presented upwardly. In the lower run of the conveyor, the track 137 is depressed downwardly as shown at 211 so that the can carrier and the can are tilted in a manner to present the opening of the bottom joint upwardly. By this construction, the flow of solder is positively directed into the joint, but this construction is not preferred and in most cases is unnecessary.

The machine shown in Figure 16 also differs from the machine shown in Figure 5 with regard to the specific structure of the frame members as will now be pointed out in connection with a modified type of chuck which we sometimes employ.

Figures 18, 19:
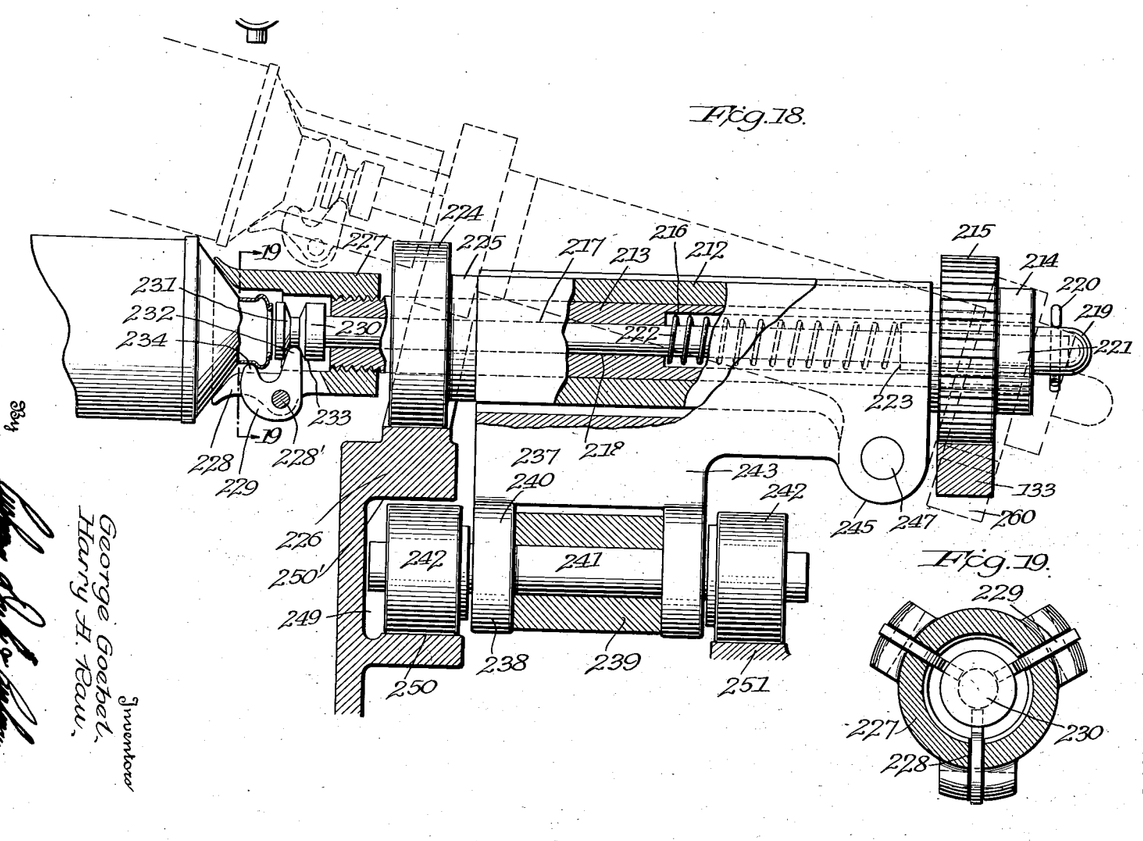
Figure 18 is an enlarged cross-section through a modified form of can carrying chuck.
Figure 19 is a cross-section on the line 19—19 of Figure 18.

Referring to Figure 18 we have shown a modified form of can carrier or chuck C. This device has a body portion 212 within which is received a shaft 213 adapted to be rotated within the body. At one end there is keyed to the shaft by a hub 214 a gear 215, the engagement of the gear 215 with the rack 133 acting to rotate the shaft 213. A recess 216 is formed in the shaft terminating in an opening 217 within which is reciprocatingly mounted the plunger 218 having connected to one end thereof the cam contact piece 219 as by a pin 220. The cam contact piece 219 is slidable in an opening 221 in the gear and hub thereof. Disposed within the recess 216 is a spring 222 which is confined by the wall of the recess and the inner end 223 of the cam contact piece and normally acts to move the plunger and contact piece outwardly of the hub 214. Mounted upon the shaft for free rotation or keyed thereto as desired is a roller 224 having a hub 225 which roller acts to support the can carrier upon the track 226, in the same manner as the roller 86 in the preferred construction shown in Figure 12. Threaded upon the free end of the rotating shaft 213 is a can-receiving throat 227 which is provided with a plurality of openings or slots 228 in its periphery and within which are pivoted at 228' can gripping fingers 229 for engaging the neck of the can externally as shown in Figure 18. Carried by the free end of the plunger 218 is a head 230 having a circular groove 231 within which is received one end 232 of each of the fingers 229. The side walls of the grooves are inclined or bevelled as shown at 233. When the cam piece 219 is pressed inwardly by engagement with a cam 63 or a cam 196, the gripping fingers 229 are expanded outwardly upon the pivot pins 228' so that a can end may be positioned within the fingers to be gripped thereby. When the cam piece is released from the cams, the plunger rod 218 returns to its normal position and causes the ends 234 of the fingers to move inwardly toward each other, into gripping relation with a can as shown in Figure 18. In this position, the can is gripped firmly and held as the can carrier moves through the machine.

Further, with reference to Figure 18, we have shown in dotted lines at 260, the rack 133 inclined and in engagement with the gear 215 (or the gear 81). Such inclination of the rack either upwardly or downwardly and the meshing of its teeth with the teeth of gear 215 or gear 81 is coincident with the cam portions 140 and 192 as shown in Figure 8, and the cam portions 210 and 211 as shown in Figure 16. In this manner, the shaft of the can carrier chuck is at all times rotated during the continuous movement of the conveyor.

While we have illustrated a container having a conical top as shown in Figure 1, this is purely for purposes of illustration, since the invention is operable to handle containers of various contours.

The invention has been illustrated in connection with the soldering of the joints for metal cans, but it will be appreciated that its application is widespread, and, for example, this apparatus may be used wherever one or more operations are required upon continuously moving articles. Thus, the invention may be used to apply a label to glass containers or to apply printing or designs to metal containers. In this connection, the invention is equally useful in connection with glass or metal containers, although we have particularly referred to metal cans.

We claim:

In an apparatus for soldering can ends to can bodies, spaced sprocket wheels rotatable in a vertical plane, an endless chain movable about said wheels and through upper and lower paths of movement, a plurality of can engaging and supporting elements projecting laterally from said chain, said elements being rotatable with respect to said chain, means adjacent one end of the upper path of movement of said chain to move said elements to can engaging position, means along said upper path to rotate said elements and the cans carried thereby, means coincidental with said last-named means to heat, apply solder to, wipe the solder toward, and, by a stream of gas under pressure, cool one end joint of the can, all while the longitudinal axis of the can is maintained in a substantially horizontal plane, means along said lower path to rotate said elements and the cans carried thereby, means coincidental with said last-named means to heat, apply solder to, wipe the solder toward, and, by a stream of gas under pressure, cool the other end joint of the can, all while the longitudinal axis of the can is maintained in a substantially horizontal plane, and means at the far end of the lower path of movement of said chain to move said can engaging and supporting elements to can releasing position.

GEORGE GOEBEL.
HARRY A. RAU.